US008616240B2

(12) United States Patent
Taga

(10) Patent No.: US 8,616,240 B2
(45) Date of Patent: Dec. 31, 2013

(54) BACKFLOW PREVENTION VALVE AND FLUID DISCHARGE DEVICE

(75) Inventor: Susumu Taga, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 724 days.

(21) Appl. No.: 12/874,585

(22) Filed: Sep. 2, 2010

(65) Prior Publication Data
US 2011/0069125 A1  Mar. 24, 2011

(30) Foreign Application Priority Data

Sep. 18, 2009 (JP) ................................. 2009-216669

(51) Int. Cl.
*F16K 15/14* (2006.01)

(52) U.S. Cl.
USPC ............................................ 137/854; 347/85

(58) Field of Classification Search
USPC ...................... 137/854, 852; 347/85
See application file for complete search history.

(56) References Cited

U.S. PATENT DOCUMENTS

| 4,677,447 | A | 6/1987 | Nielsen |
| 6,267,473 | B1 | 7/2001 | Smith |
| 6,666,552 | B2 | 12/2003 | Anderson et al. |
| 2009/0141101 | A1 | 6/2009 | Takagi |
| 2011/0168723 | A1 | 7/2011 | Malec et al. |

FOREIGN PATENT DOCUMENTS

| CN | 101529077 A | 9/2009 |
| JP | 56-006966 A | 1/1981 |
| JP | 02-030586 U | 2/1990 |
| JP | 2000-179719 A | 6/2000 |
| JP | 2007-216535 A | 8/2007 |
| JP | 2009-108967 A | 5/2009 |
| JP | 2009-133458 A | 6/2009 |
| WO | 02/028648 A1 | 4/2002 |

*Primary Examiner* — Kevin Lee
*Assistant Examiner* — Macade Brown
(74) *Attorney, Agent, or Firm* — Nutter McClennen & Fish LLP; John J. Penny, Jr.; Michael P. Visconti, III

(57) ABSTRACT

An inkjet printer has a backflow prevention valve disposed to bottom of subtanks to of the diaphragm pump unit mounted on a carriage, and causes ink passing through the backflow prevention valve to flow to the inkjet head side. A support orifice that supports an umbrella-shaped valve plug, a port formed at a position circumferentially eccentric to the center of the support orifice, and a fluid conduction channel extending from an edge of the port circumferentially around the support orifice are disposed to the valve plug seating surface of the backflow prevention valve. A discharge orifice that discharges ink to the inkjet head side is disposed in the outside wall of the valve plug seating surface, and the discharge orifice and port are formed on the same side of the center of the support orifice.

10 Claims, 8 Drawing Sheets

BACKFLOW PREVENTION VALVE AND FLUID DISCHARGE DEVICE

BACKGROUND

1. Technical Field

The present invention relates to a backflow prevention valve having a valve plug disposed opposite a port formed in the valve plug seating surface, and causes the valve plug to deform elastically according to fluid pressure to open and close the port, and relates more particularly to a backflow prevention valve that can suppress an increase in path resistance and a drop in the flow rate even when the valve port is formed at an eccentric position. The invention also relates to a fluid discharge device that has this backflow prevention valve disposed in the fluid path.

2. Related Art

Constructions that have a support orifice supporting the valve plug and a fluid port through which fluid flows formed in the valve plug seating surface, have the valve plug disposed opposite the fluid port, and elastically deform the valve plug according to the fluid pressure from the fluid port side and the fluid pressure from the opposite side to open and close the fluid port are used as backflow prevention valves because of their simple, compact construction.

Japanese Unexamined Patent Appl. Pub. JP-A-2009-108967 teaches a backflow prevention valve that has an umbrella-like valve plug supported in a support orifice formed in the center of the valve plug seating surface of the valve seat. In JP-A-2009-108967, fluid ports are formed at equal angles around the support orifice in the valve plug seating surface, and adjacent ports communicate through a communication channel. By providing this communication channel, fluid can flow from the edge of the umbrella even where only the communication path is formed, the sectional area of the fluid path can thus be increased, and pressure loss can be reduced.

Because where the ports are formed is not specifically limited with the backflow prevention valve taught in JP-A-2009-108967, a plurality of ports can be disposed evenly in the circumferential direction around the support orifice. With this backflow prevention valve, however, there are situations in which ports cannot be disposed wherever desired in the sealed area that is sealed by the umbrella of the valve plug (the circular area surrounding the support orifice) due to installation space requirements. In such situations fluid flows from the part of the sealed area eccentric to the center of the support orifice (the area where the fluid port is formed), but there is substantially no flow where the ports are not formed. Path resistance therefore increases and pressure loss increases.

In addition, because the flow rate drops where the ports are not formed, bubbles grow where the flow rate is low when a fluid that contains bubbles flows, and large bubbles can grow easily. The bubbles therefore do not flow easily, interfere with smooth fluid flow, and can adversely affect flow on the downstream side of the backflow prevention valve. For example, if this type of backflow prevention valve is disposed in the fluid supply path of a fluid discharge device, fluid discharge quality drops as a result of fluid containing large bubbles being supplied to the fluid discharge head.

SUMMARY

A backflow prevention valve and a fluid discharge device according to the present invention can suppress an increase in path resistance, a drop in flow rate, and bubble growth even when the location of fluid ports in the area that is sealed by the valve plug is eccentric to the center of the sealed area due to installation space requirements.

A first aspect of the invention is a backflow prevention valve including a port; a valve plug that is disposed covering the port, closes the port when fluid flows in one direction, and opens the port when fluid flows in the opposite direction; and a valve plug seating surface in which the port is formed. The port is formed in the valve plug seating surface at a position eccentric to the center of the seal area of the valve plug, and a fluid conduction channel is formed in the valve plug seating surface extending from a position where the port is formed to a position on the opposite side of the seal area center.

In this aspect of the invention as described above a fluid conduction channel is formed on the valve plug seating surface extending from the position where a port disposed eccentrically to the center of the area sealed by the valve plug is formed to the other end of the port on the opposite side of the center of this sealed area. With this configuration fluid flowing in from the port flows along the fluid conduction channel and travels around to the opposite side of the port in the sealed area even if the port is formed at a position eccentric to the center of the area sealed by the valve plug. As a result, fluid can be made to flow to all parts of the gap between the valve plug and the valve plug seating surface and flow out in all directions, and the valve plug can be separated from the valve plug seating surface. The path resistance of the backflow prevention valve can therefore be reduced, and loss of pressure applied to fluid supply can be reduced.

Preferably in another aspect of the invention, the valve plug has a stem affixed in a support orifice formed in the center of the seal area in the valve plug seating surface, and a disc that is formed on one end of the stem and opposes the valve plug seating surface; the port is formed at a position circumferentially eccentric to the center of the support orifice. As a result, the fluid conduction channel can be made to extend from one edge of the port circumferentially around the center of the support orifice to a position that is the opposite side of the port.

By thus affixing an umbrella-shaped valve plug in a support orifice in the valve plug seating surface, a backflow prevention valve with a compact, simple construction can be achieved. With this configuration, even if the port is formed at an eccentric position circumferentially to the center of the support orifice, fluid flowing in from the port to the entire seal area surrounding the support orifice can flow through the fluid conduction channel, causing the disc to lift and allowing fluid to flow out from any place around the circumference of the disc. The loss of pressure applied to fluid supply can therefore be reduced, and the growth of bubbles can be suppressed.

In another aspect of the invention, the valve plug seating surface is surrounded by a peripheral wall, and a discharge opening is formed in the peripheral wall for discharging to the outside of the wall fluid flowing in from the port to the disc side when the disc of the valve plug separates from the valve plug seating surface. This discharge opening is positioned on the same side of the center of the support orifice as the port.

This aspect of the invention can produce flow to the opposite side of the port because part of the flow from the port to the discharge opening can be reliably directed to the opposite side of the port by the fluid conduction channel. As a result, even if the port and the discharge opening are on the same side, fluid can be made to flow from any part around the circumference of the disc, and flow path resistance can be reduced. Yet further, a drop in the flow rate in areas where the port is not formed can be suppressed, and the growth of bubbles can be suppressed.

Further preferably in another aspect of the invention, the port extends arcuately around the support orifice, and is segmented circumferentially by a rib connecting the inside edge and the outside edge of the port.

This aspect of the invention extends the port in an arc, increasing the open area and reducing path resistance while supporting the disc by means of the rib when the disc closes the port.

Further preferably in another aspect of the invention, the depth of the fluid conduction channel is deepest where the fluid conduction channel connects to the edge of the port, and becomes gradually shallower with distance from the port.

This aspect of the invention can cause the disc to rise at all points around the circumference because fluid flowing in from the port flows circumferentially along the conduction channel and rises toward the disc.

In another aspect of the invention the valve plug seating surface is disposed in a dividing wall separating a fluid storage unit disposed to a carriage on which a fluid discharge head is disposed, and a flow path through which fluid in the fluid storage unit flows to the fluid discharge head side; and the port passes through the divider wall and communicates with the fluid storage unit and the flow path.

In a configuration in which a subtank or other fluid storage unit and fluid discharge head are disposed to a carriage, the backflow prevention valve that communicates with the subtank and the fluid supply path must be disposed in a confined space. This aspect of the invention reduces path resistance in the backflow prevention valve, and suppresses a drop in the flow rate and formation of bubbles even when the port must be eccentrically located due to installation space requirements.

Another aspect of the invention is a fluid discharge device including a fluid discharge head; a flow path for supplying fluid to the fluid discharge head; and the backflow prevention valve of the invention disposed in the fluid path.

EFFECT OF THE INVENTION

With the invention described herein, fluid flowing in from the port flows along the fluid conduction channel and travels around to the opposite side of the port in the sealed area even if the port is formed at a position eccentric to the center of the area sealed by the valve plug. As a result, fluid can be made to flow to all parts of the gap between the valve plug and the valve plug seating surface and flow out in all directions, and the valve plug can be separated from the valve plug seating surface. The path resistance of the backflow prevention valve can therefore be reduced, and loss of pressure applied to fluid supply can be reduced. In addition, by flowing fluid through the fluid conduction channel to the opposite side of the port, a drop in the flow rate in areas where the port is not formed can be suppressed, and formation of bubbles can be suppressed.

Other objects and attainments together with a fuller understanding of the invention will become apparent and appreciated by referring to the following description and claims taken in conjunction with the accompanying drawings.

DESCRIPTION OF EMBODIMENTS

An inkjet printer and a control method therefor are described below as a preferred embodiment of a fluid discharge device according to the invention with reference to the accompanying figures.

General Configuration of an Inkjet Printer

Figure 1:
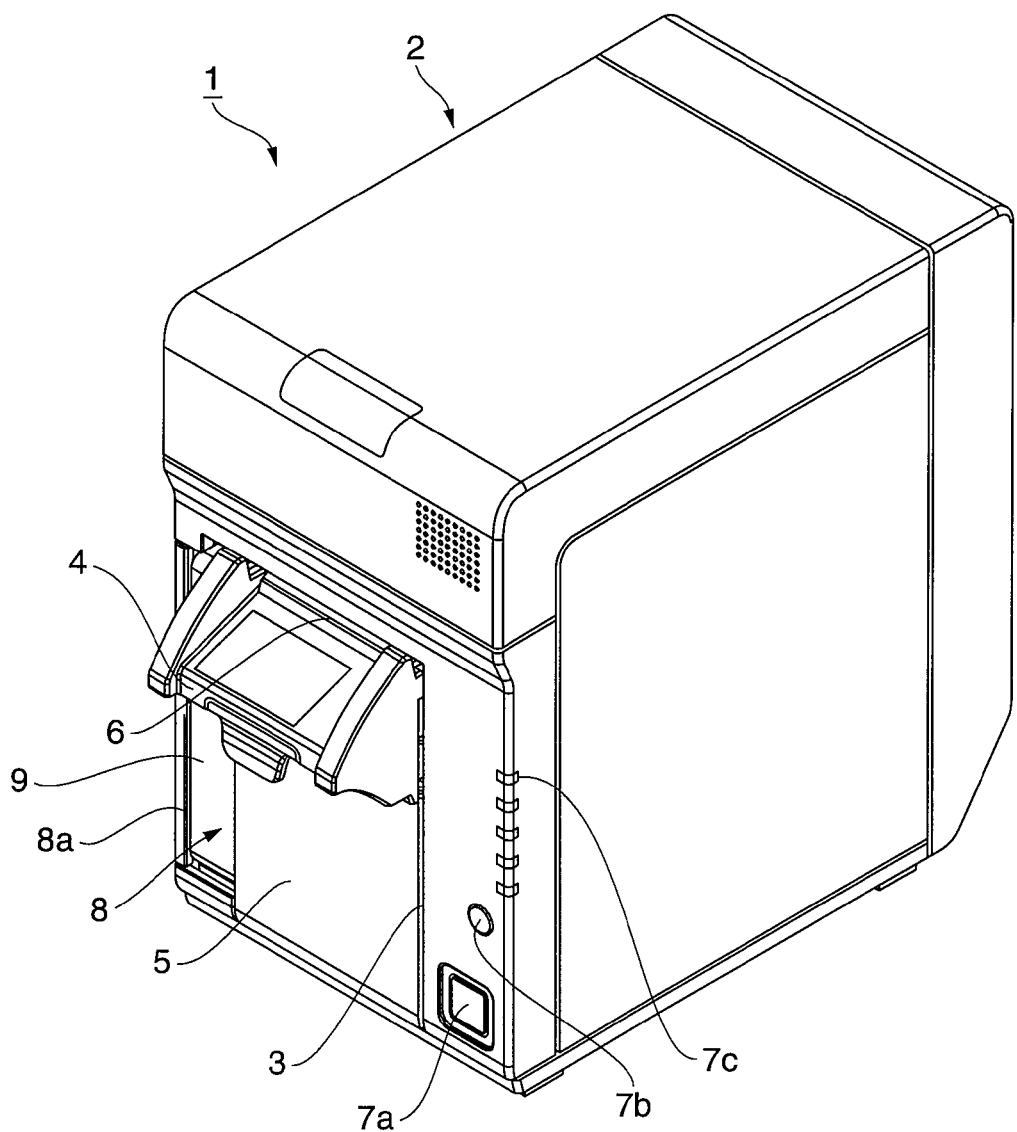
FIG. 1 is an external oblique view of an inkjet printer to which the invention is applied.

FIG. 1 is an external oblique view of an inkjet printer. The inkjet printer 1 prints in color on continuous web of recording paper delivered from a paper roll using plural different colors of ink, and has a generally box-shaped printer case 2. An opening 3 for loading roll paper is formed in the front center part of the printer case 2, and the opening 3 is closed by an access cover 5 to which a recording paper discharge guide 4 is disposed at the top. A recording paper exit 6 is formed between the recording paper discharge guide 4 and the top edge part of the opening 3 in the printer case 2. When a lock mechanism not shown is released and the recording paper discharge guide 4 is pulled forward by hand, the access cover 5 can pivot forward at the bottom end thereof from the closed position shown in the figure to an open position.

A power switch 7a, paper feed switch 7b, and a plurality of operating status indicators 7c are arrayed at the right side of the access cover 5 at the front of the printer case 2. A loading opening 8a for an ink cartridge loading unit 8 that is rectangular in section and is disposed with the long side extending in the front-back direction of the printer is formed in the front of the printer case 2 on the left side of the access cover 5, and an ink cartridge 9 is loaded in this ink cartridge loading unit 8. When a button not shown is operated, the lock is released, the ink cartridge 9 is pushed forward by the force of a spring, and the ink cartridge 9 can be removed.

Figure 2:
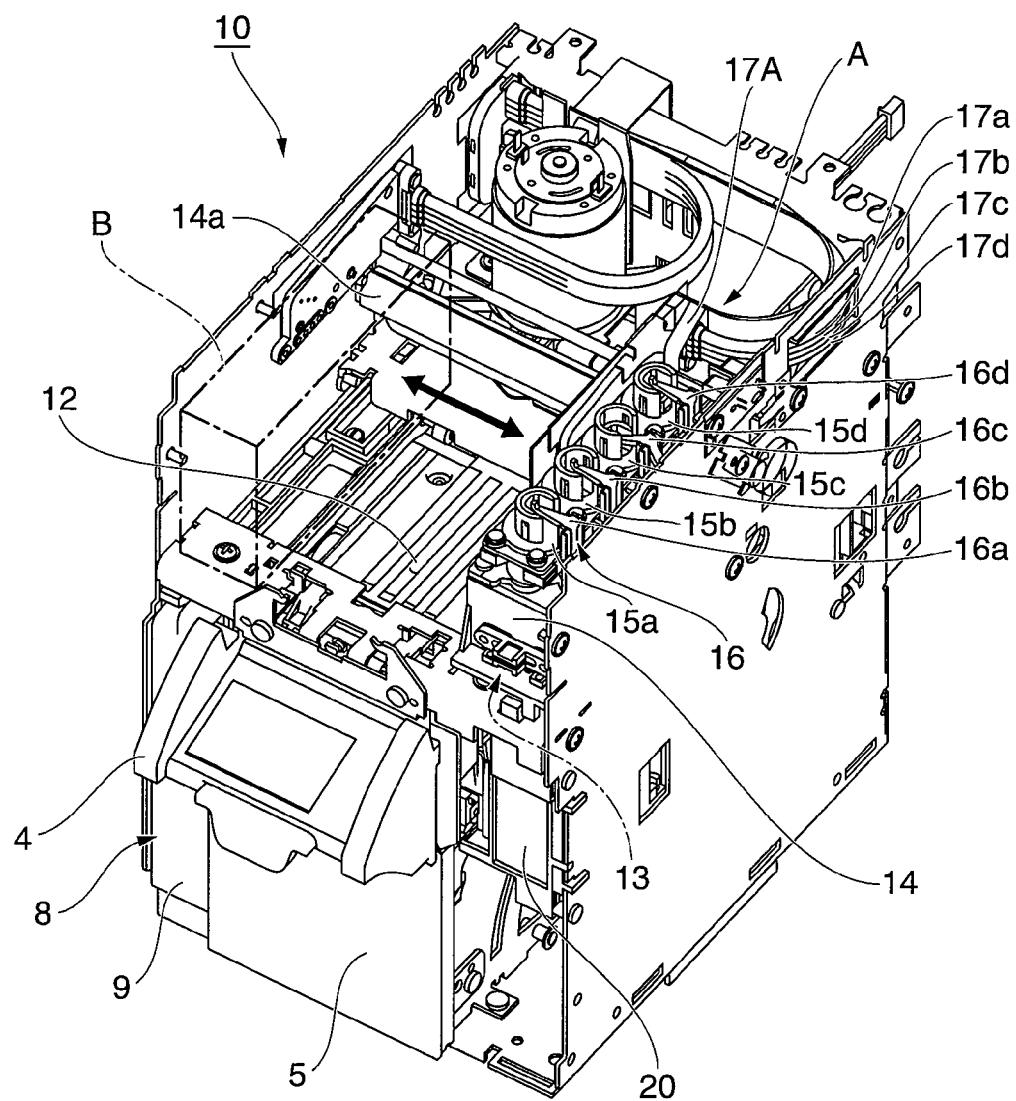
FIG. 2 is a schematic oblique view of the printer mechanism.

FIG. 2 is an oblique view of the print mechanism unit 10 that is covered by the inkjet printer 1 printer case 2. A roll paper storage compartment is formed inside the print mechanism unit 10 in the center, and when the access cover 5 opens, this roll paper storage compartment is open at the front and the roll paper can be replaced, for example. A platen 12 extends widthwise to the printer above the roll paper storage compartment, and a carriage 14 on which an inkjet head 13 (fluid discharge head) is mounted with the nozzle surface facing down is disposed above the platen 12.

The carriage 14 can move along a carriage guide shaft 14a extending widthwise to the printer between a home position A, which is indicated by a solid line in FIG. 2 and is removed to the right from the platen 12, and a left end position B removed to the left side of the platen 12 as indicated by the imaginary line in FIG. 2. The inkjet printer 1 prints on the recording paper by conveying recording paper delivered from the paper roll over the surface of the platen 12 by means of a recording paper transportation mechanism not shown and discharging ink from the inkjet head 13 facing the recording paper while the carriage 14 scans the paper in conjunction with the paper transportation operation.

A head maintenance unit 20 is disposed at a position separated to the right side from the platen 12. Head maintenance such as discharging ink droplets not used for printing but to maintain and restore the nozzles (flushing), and suctioning ink from the ink nozzles (nozzle cleaning), is performed when the inkjet head 13 mounted on the carriage 14 is in the home position A shown in FIG. 2 opposite the head maintenance unit 20. Waste ink discharged from the inkjet head 13 is recovered through a waste ink recovery path not shown from the head maintenance unit 20 to the ink cartridge 9 installed in the ink cartridge loading unit 8. The head maintenance unit 20 caps the nozzle surface of the inkjet head 13 during flushing and recovers the discharged waste ink. In addition, during nozzle cleaning, the vacuum pump is driven while the nozzle surface of the inkjet head 13 is capped to forcibly discharge ink from the nozzles by means of the suction produced by the negative pressure from the vacuum pump.

Ink Supply System

Figure 3:
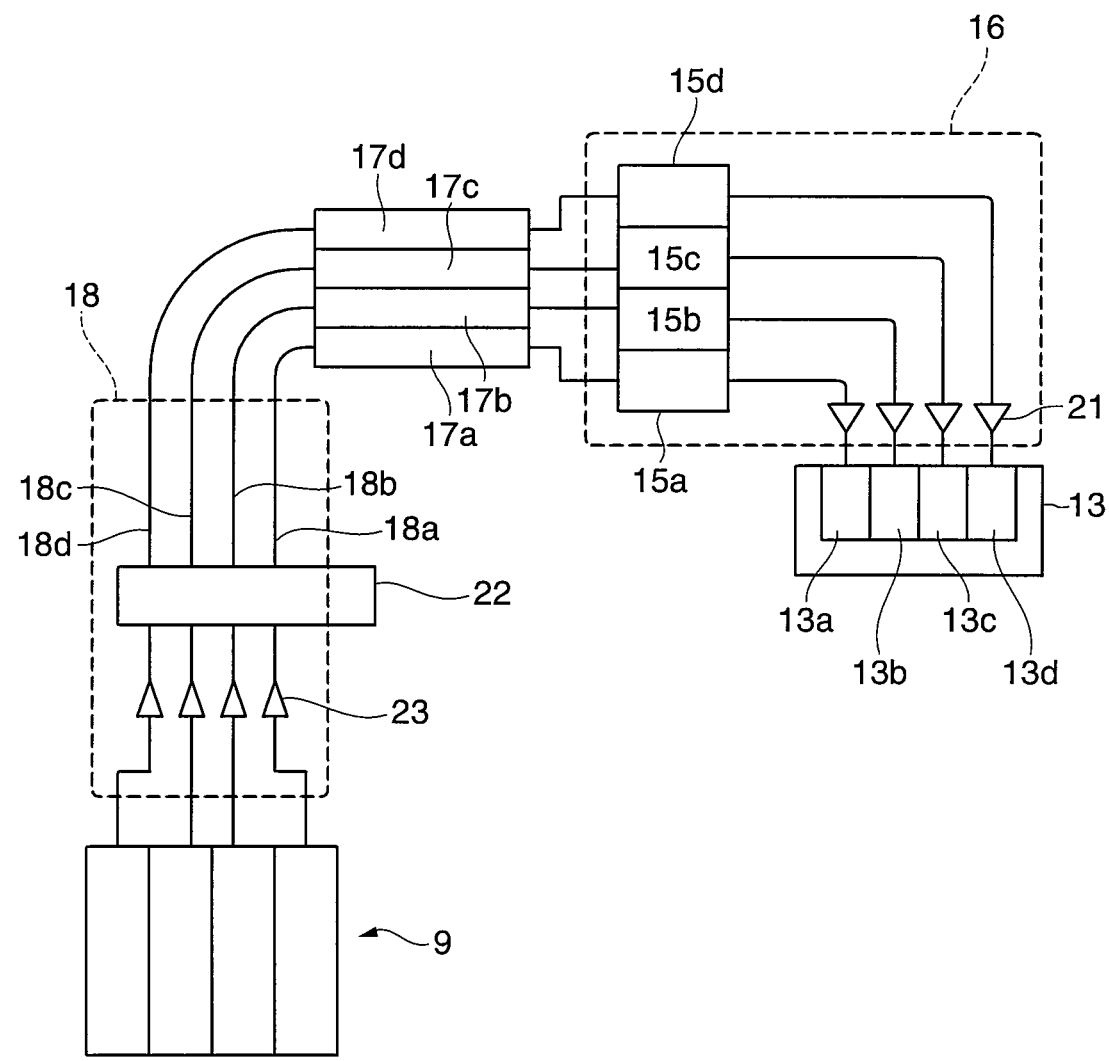
FIG. 3 schematically describes the ink supply path of an inkjet printer.
Figure 4:
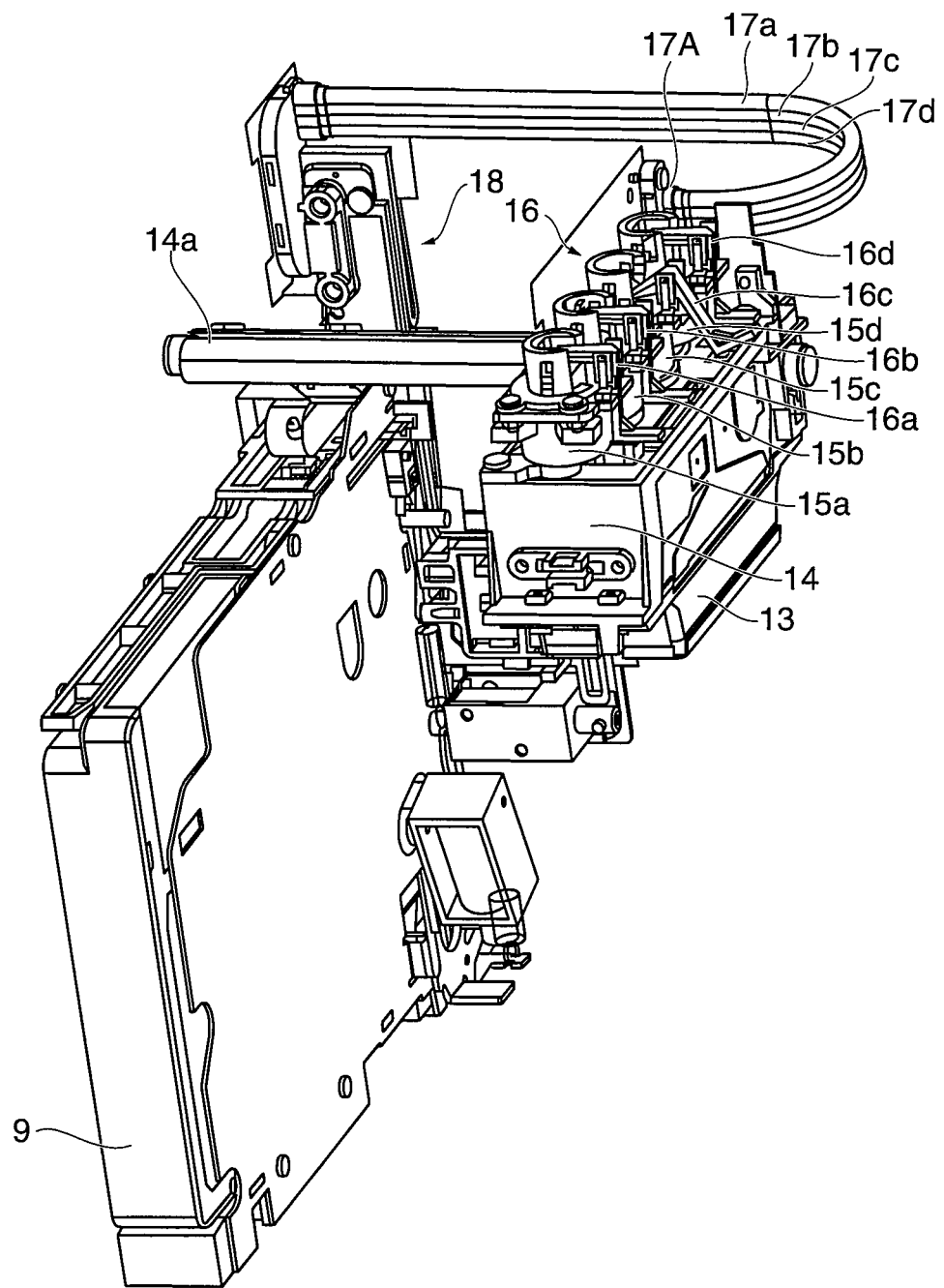
FIG. 4 is an oblique view of the carriage and ink supply system.

FIG. 3 schematically describes the configuration of the ink supply system of the inkjet printer 1, and FIG. 4 is an oblique view of the carriage in the print mechanism unit shown in FIG. 2 and the ink supply system.

As shown in FIG. 4, a diaphragm pump unit 16 is disposed to the carriage 14. The diaphragm pump unit 16 has subtanks 15a to 15d (fluid storage units) in which four colors of ink, cyan, magenta, yellow, and black, are stored.

Ink supplied from the diaphragm pump unit 16 to the inkjet head 13 is temporarily stored in the subtanks 15a to 15d, and then as shown in FIG. 3 is supplied to the in-head fluid paths 13a to 13d of the inkjet head 13.

A backflow prevention valve 21 is disposed in each path connecting the subtanks 15a to 15d to the in-head fluid paths 13a to 13d of the inkjet head 13 so that ink can only flow in one direction from the subtanks 15a to 15d to the inkjet head 13.

Figure 6:
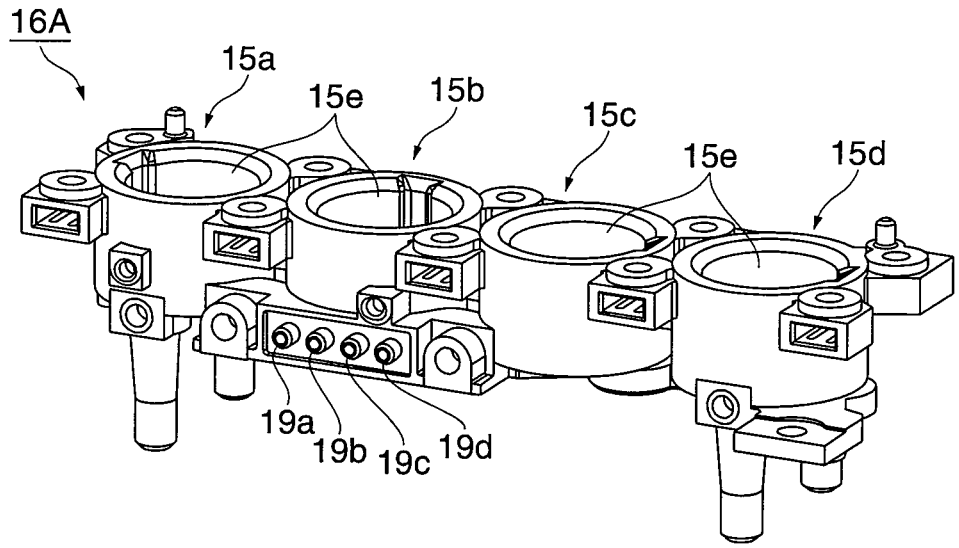
FIG. 6 is an oblique view of the bottom unit (when facing up) of the diaphragm pump unit.
Figure 7:
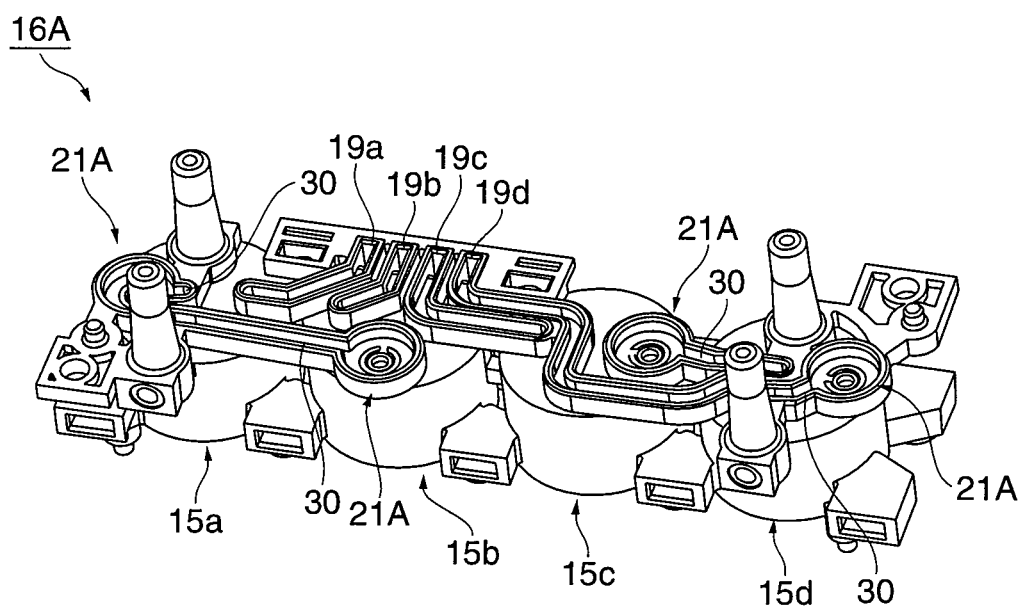
FIG. 7 is an oblique view of the bottom unit when turned upside down.
Figure 8:
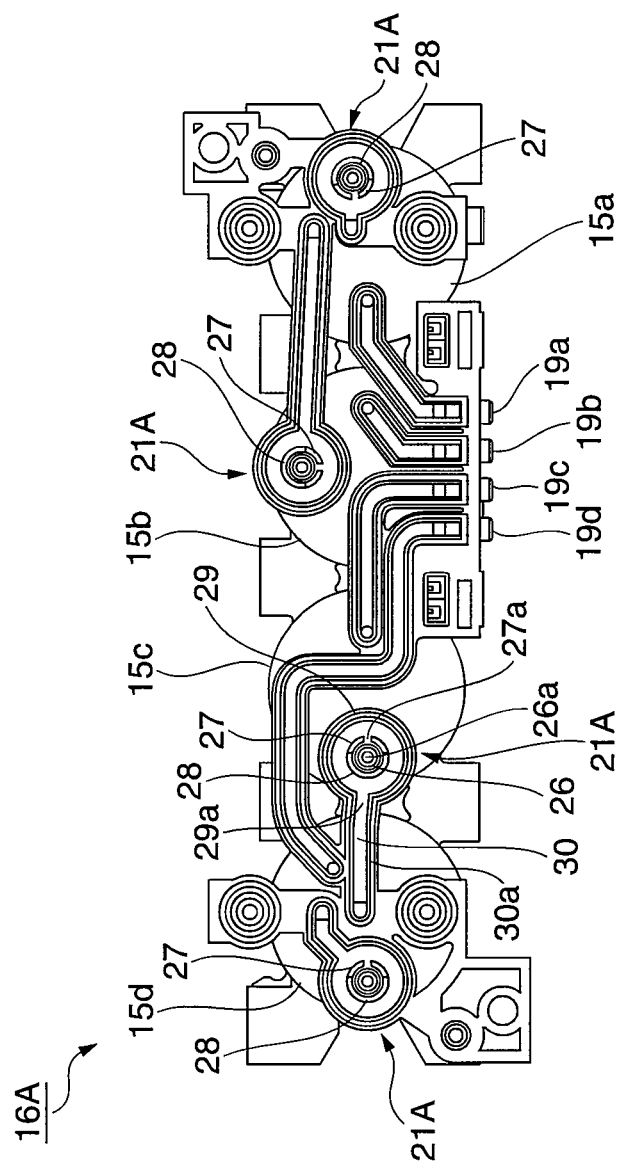
FIG. 8 is a bottom view of the bottom unit.

One end of flexible ink tubes 17a to 17d is connected to subtanks 15a to 15d, respectively, through a joint path 17A and corresponding connection paths 19a to 19d (see FIG. 6 to FIG. 8). Note that the joint path 17A and connection paths 19a to 19d are not shown in FIG. 3.

As shown in FIG. 2 and FIG. 4, the diaphragm pump unit 16 has suction levers 16a to 16d attached rockably to the top part of the subtanks 15a to 15d. One end of each suction levers 16a to 16d is disposed on the home position side of the diaphragm pump unit 16, and the other end is linked by a spring to the diaphragm 16B (see FIG. 5) of each subtank 15a to 15d. When the diaphragm pump unit 16 returns to the home position A in FIG. 2, one end of each suction lever 16a to 16d is pushed by the inside wall of the printer case 2, causing the suction levers 16a to 16d to rock, thereby operating the diaphragm 16B connected to the other ends of the suction levers 16a to 16d and producing negative pressure in the subtanks 15a to 15d. Ink is pulled from the flexible ink tube 17a to 17d side into each subtank by this negative pressure.

The other ends of the flexible ink tubes 17a to 17d are connected to the top end parts of a flat fluid path 18 disposed to a position behind the ink cartridge loading unit 8. As shown in FIG. 3, four ink supply paths 18a to 18d extending vertically are disposed to the flat fluid path 18, and flexible ink tubes 17a to 17d are connected to the top ends of these ink supply paths 18a to 18d, respectively. A choke valve mechanism 22 is disposed to each of the ink supply paths 18a to 18d so that the ink supply paths 18a to 18d can be closed for cleaning. A backflow prevention valve 23 is disposed on the upstream side of the choke valve mechanism 22 so that ink can flow in only one direction from the ink cartridge 9 to the flexible ink tubes 17a to 17d side.

As shown in FIG. 4, the ink cartridge 9 has a flat rectangular box-like shape that is long both front-to-back and vertically, and has four ink packs for cyan, magenta, yellow, and black stored side by side vertically thereinside. When the ink cartridge 9 is inserted to the installation position of the ink cartridge loading unit 8, four ink supply needles for connecting the supply paths 18a to 18d to the ink cartridge 9 are inserted to the ink supply needle insertion openings rendered in each ink pack. This forms the ink supply path that supplies each color of ink from the ink packs in the ink cartridge 9 through the ink supply needles to the inkjet head 13 side.

Construction of the Bottom Part of the Diaphragm Pump Unit

Figure 5:
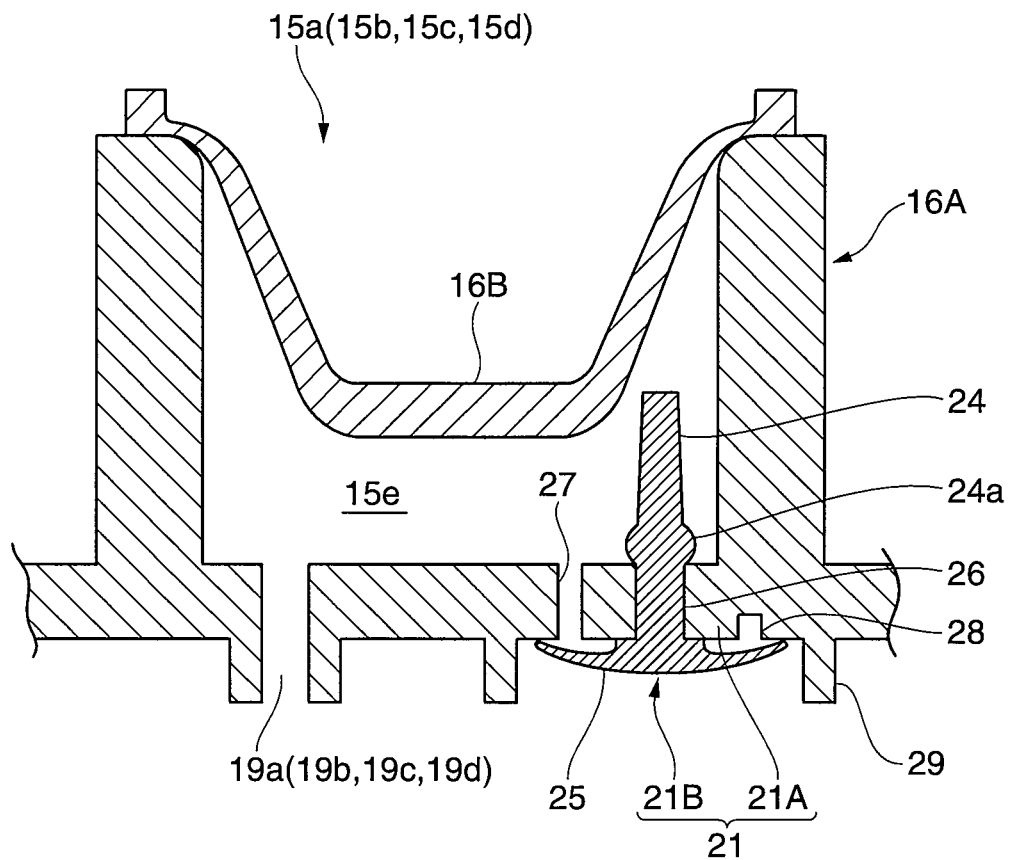
FIG. 5 is a section view of the subtank part of a diaphragm pump unit.

FIG. 5 is a partial section view showing the configuration of each subtank of the diaphragm pump unit in section. Note that the suction levers 16a to 16d and other aspects of the configuration of the subtank top are not shown in FIG. 5. FIG. 6 is an oblique view showing the bottom unit of the diaphragm pump unit when facing up, FIG. 7 is an oblique view of the same bottom unit turned over, and FIG. 8 shows the bottom of the bottom unit.

As shown in FIG. 6, the diaphragm pump unit 16 has a bottom unit 16A with four wells 15e formed facing up as ink storage spaces. As shown in FIG. 5, the open top part of each well 15e is sealed by a diaphragm 16B.

As shown in FIG. 6 to FIG. 8, one end of the connection paths 19a to 19d for connecting to the joint path 17A that is the connection unit to the flexible ink tubes 17a to 17d opens into the bottom of each subtank 15a to 15d. The connection paths 19a to 19d extend along the bottom of each subtank 15a to 15d, and are gathered together at one location on the side of the bottom unit 16A where they connect to the joint path 17A (see FIG. 2). As described above, ink is suctioned from the connection paths 19a to 19d to the wells 15e as a result of the diaphragm 16B working vertically in conjunction with the suction levers 16a to 16d.

Backflow Prevention Valve

The valve plug seating surface 21A of the backflow prevention valve 21 for causing ink to flow to the in-head fluid paths 13a to 13d side of the inkjet head 13 is disposed to the bottom (divider wall part) of each subtank 15a to 15d.

As shown in FIG. 5, the backflow prevention valve 21 has a round valve plug seating surface 21A and an umbrella-shaped valve plug 21B attached to the valve plug seating surface 21A. The valve plug 21B is made of an elastic material such as silicon rubber, and has a straight stem 24 and a round disc 25 formed on one end of the stem 24. A removal prevention part 24a that is thicker than the other parts of the stem 24 is formed in the lengthwise center part of the stem 24. The disc 25 is formed with the part thereof near the stem 24 thick and the thickness thinning towards the outside edge, and a gently curving shape that curves gently toward the stem 24 side to a peak where the disc 25 joins the stem 24.

Figure 9A:
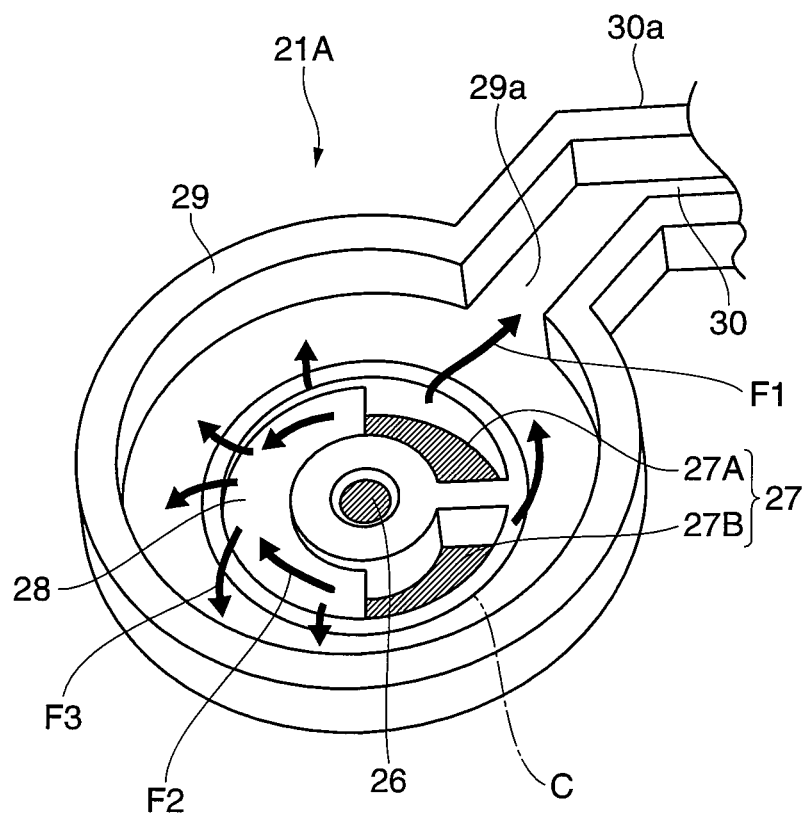
FIGS. 9A and 9B show an enlarged oblique view and a plan view of the valve plug seating surface when seen from the bottom side of the bottom unit.
Figure 9B:
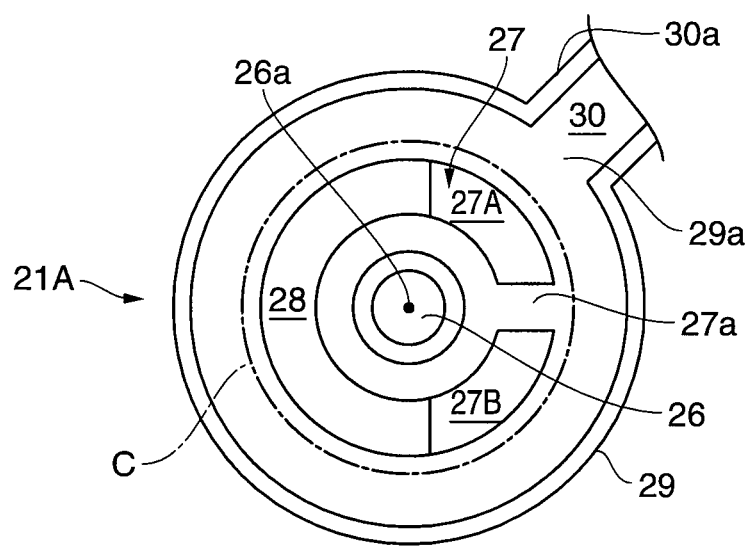

FIG. 9A is an oblique view of the valve plug seating surface seen from the bottom side of the bottom unit, and FIG. 9B is a plan view of the valve plug seating surface. The valve plug 21B is fit from the bottom side of the bottom unit 16A into the support orifice 26 formed in the center of the valve plug seating surface 21A. More specifically, the valve plug 21B is positioned so that the removal prevention part 24a inside the well 15e prevents the valve plug 21B from falling out, and a portion of the circular area centered on the support orifice 26 in the bottom of each subtank 15a to 15d (the area C inside the imaginary line in FIG. 9) can be sealed by the disc 25.

The valve plug seating surface 21A is surrounded by a round outside wall 29 formed on the bottom of each subtank 15a to 15d, and includes the support orifice 26 formed in the center of the round area enclosed by the outside wall 29, an arcuate valve port 27 extending circumferentially through a specific angular range surrounded by the outside wall 29, and an arcuate fluid conduction channel 28 extending with the same width as the port 27 circumferentially from the edge of the port 27. The port 27 is divided circumferentially into two ports 27A and 27B disposed side by side by a rib 27a that extends radially.

The port 27 and fluid conduction channel 28 are formed inside the round seal area C around the support orifice 26. The area where the port 27 is formed inside the seal area C is circumferentially eccentric to the center 26a of the support orifice 26. In addition to the valve plug seating surface 21A, other fluid paths such as the connection paths 19a to 19d are formed in the bottom of the bottom unit 16A as shown in FIG. 7 and FIG. 8. As a result, due to space limitations, the valve plug seating surface 21A cannot be formed in the bottom center of each subtank 15a to 15d, and part of each valve plug seating surface 21A extends to outside of the bottom of the well 15e in each subtank 15a to 15d. The port 27 in each valve plug seating surface 21A can only be formed on the side that does not protrude to the outside from the bottom of the well 15e.

With the valve plug seating surface 21A shown in FIG. 9A and FIG. 9B, the port 27 (27A, 27B) is formed through an approximately 180 degree range on the right side of the support orifice 26. The fluid conduction channel 28 is formed throughout the approximately 180 degree range on the left side of the support orifice 26 where the port 27 is not formed. The fluid conduction channel 28 has a substantially semicircular arcuate shape that extends between the opposite circumferential ends of the port 27. The fluid conduction channel 28 in this embodiment of the invention thus extends from one end of the port 27 to a position that is the other end of the port 27 on the opposite side of the center 26a of the support orifice 26. In other words, the fluid conduction channel 28 extends to a position farthest removed circumferentially from the port 27. The fluid conduction channel 28 is deepest at the part connected to the edge of the port 27, becomes gradually shallower with distance from the edge of the port 27, and is shallowest at the position opposite the rib 27a.

A discharge orifice 29a is formed at a position on the same side of the center 26a of the support orifice 26 as the port 27 in the outside wall 29 surrounding the valve plug seating surface 21A, and a discharge path 30 is formed extending radially from this discharge orifice 29a. The discharge path 30 is delineated by path walls 30a of the same height as the outside wall 29, and is the connection path for connection to the in-head fluid paths 13a to 13d of the inkjet head 13.

When ink backflows from the inkjet head 13 side to the discharge path 30 in this configuration and the fluid pressure inside the discharge path 30 and inside the outside wall 29 becomes greater than the fluid pressure inside the well 15e, the disc 25 is pushed against the valve plug seating surface 21A and seals the seal area C. More specifically, the backflow prevention valve 21 closes. As a result, the backflow ink cannot pass through the port 27 of the backflow prevention valve 21, and ink does not flow back into the well 15e, that is, the ink storage space. However, when the fluid pressure inside the well 15e becomes greater than the fluid pressure inside the outside wall 29, the peripheral part of the disc 25, which is an elastic member, is deformed by the fluid pressure applied to the disc 25 from the port 27 and lifts away from the valve plug seating surface 21A, forming a path for ink to flow between the disc 25 and the valve plug seating surface 21A. As a result, ink flowing in from the port 27 flows through the space between the disc 25 and the valve plug seating surface 21A to the discharge path 30 side. More specifically, the backflow prevention valve 21 opens.

When the backflow prevention valve 21 is open, part of the ink flowing in from the port 27 flows circumferentially along the fluid conduction channel 28 to the opposite side as the port 27 as indicated by arrow F2 in FIG. 9A, and does not all flow out from the discharge path 30 on the same side as the port 27 as indicated by arrow F1 in FIG. 9A. Ink is thus supplied to positions along the fluid conduction channel 28, and ink also circulates to a part on the opposite side of the port 27 in the seal area C (the part farthest from the port 27). As a result, the peripheral part of the disc 25 at the circumferential positions to which ink travels along the fluid conduction channel 28 lifts away from the valve plug seating surface 21A, and ink flows at these circumferential positions to the outside of the seal area C as indicated by arrow F3 in FIG. 9A. Because the ink flowing along the fluid conduction channel 28 at this time flows diagonally upward along the slope of the bottom of the fluid conduction channel 28, the fluid pressure of the ink flowing along the fluid conduction channel 28 works effectively as a force causing the disc 25 to rise.

As described above, when the port 27 cannot be formed in the valve plug seating surface 21A at uniform intervals circumferentially, ink flow is produced by the fluid conduction channel 28 in this embodiment of the invention on the side where the port 27 is not formed, and can thereby suppress an increase in path resistance. As a result, pressure loss during ink supply can also be reduced. In addition, a drop in the ink flow rate on the side where the port 27 is not formed can be suppressed, and formation of bubbles in the ink can be suppressed.

Because the port 27 is extended circumferentially to increase the aperture area while a rib 27a is formed to segment the port 27 circumferentially in this embodiment of the invention, the peripheral part of the disc 25 disposed tight to the seal area C can be supported by this rib 27a. A drop in seal performance due to increasing the area of the port 27 can therefore be suppressed.

The port 27 is formed through a substantially 180 degree range, and the rib 27a is formed in the circumferential center of this range in the foregoing embodiment of the invention, but the range of the port 27 and where the rib is formed can be desirably adjusted according to such conditions as the installation space and the required strength. In addition, the width, depth, bottom slope, and other parameters of the fluid conduction channel 28 are not limited to the foregoing embodiment and can be changed as appropriate. Yet further, the plane shape of the disc 25, outside wall 29, and valve plug seating surface 21A, for example, is not limited to circular, and may be polygonal or elliptical. In this configuration the plane shape of the port 27 and fluid conduction channel 28 may be changed according to the plane shape of the disc 25.

Further alternatively, a configuration in which a stem part is formed on the back side surface of the valve plug 21B (the opposite side as the valve plug seating surface 21A), and this stem part is disposed in a support orifice formed in a member on the back side of the valve plug 21B instead of forming the support orifice 26 in the valve plug seating surface 21A, is also conceivable.

Other Embodiments

The foregoing embodiment describes an application of the invention to a backflow prevention valve disposed in a fluid path of an inkjet printer 1, but the invention can also be applied in other types of fluid discharge devices that discharge fluids other than ink. For example, the invention can be applied in fluid discharge devices that discharge reagent solutions or fluid specimens, for example, from a fluid discharge head, and to fluid discharge devices that discharge liquid coatings or liquid materials from a fluid discharge head to coat a target by printing. The invention is also not limited to fluid discharge devices, and can be applied to backflow prevention valves disposed in other types of equipment and devices.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. A backflow prevention valve comprising:
   a port;
   a valve plug that is disposed covering the port, closes the port when fluid flows in one direction, and opens the port when fluid flows in the opposite direction; and
   a valve plug seating surface in which the port is formed;
   wherein the port is formed in the valve plug seating surface at a position eccentric to the center of a seal area of the valve plug;
   a fluid conduction channel is formed in the valve plug seating surface extending from a position where the port is formed to a position on the opposite side of the seal area center;
   the valve plug has a stem affixed in a support orifice formed in the center of the seal area in the valve plug seating surface, and a disc that is formed on one end of the stem and opposes the valve plug seating surface;
   the port is formed at a position circumferentially eccentric to the center of the support orifice; and
   the fluid conduction channel extends from one edge of the port circumferentially around the center of the support orifice to a position that is the opposite side of the port.

2. The backflow prevention valve described in claim 1, wherein:
   the valve plug seating surface is surrounded by a peripheral wall;
   a discharge opening is formed in the peripheral wall for discharging to the outside of the wall fluid flowing in from the port to a disc side when the disc of the valve plug separates from the valve plug seating surface; and
   the port and the discharge opening are formed on the same side of the center of the support orifice.

3. The backflow prevention valve described in claim 1, wherein:
   the port extends arcuately around the support orifice, and is segmented circumferentially by a rib connecting an inside edge and an outside edge of the port.

4. A backflow prevention valve comprising:
   a port;
   a valve plug that is disposed covering the port, closes the port when fluid flows in one direction, and opens the port when fluid flows in the opposite direction; and
   a valve plug seating surface in which the port is formed;
   wherein the port is formed in the valve plug seating surface at a position eccentric to the center of a seal area of the valve plug;
   a fluid conduction channel is formed in the valve plug seating surface extending from a position where the port is formed to a position on the opposite side of the seal area center; and
   the depth of the fluid conduction channel is deepest where the fluid conduction channel connects to an edge of the port, and becomes gradually shallower with distance from the port.

5. A backflow prevention valve comprising:
   a port;
   a valve plug that is disposed covering the port, closes the port when fluid flows in one direction, and opens the port when fluid flows in the opposite direction; and
   a valve plug seating surface in which the port is formed;
   wherein the port is formed in the valve plug seating surface at a position eccentric to the center of a seal area of the valve plug;
   a fluid conduction channel is formed in the valve plug seating surface extending from a position where the port is formed to a position on the opposite side of the seal area center;
   the valve plug seating surface is disposed in a dividing wall separating a fluid storage unit disposed to a carriage on which a fluid discharge head is disposed, and a flow path through which fluid in the fluid storage unit flows to the fluid discharge head; and
   the port passes through the dividing wall and communicates with the fluid storage unit and the flow path.

6. A fluid discharge device comprising:
   a fluid discharge head;
   a flow path for supplying fluid to the fluid discharge head; and
   a backflow prevention valve disposed in the flow path;
   wherein the backflow prevention valve includes a port, a valve plug that is disposed to cover the port and is opened and closed by fluid, and a valve plug seating surface in which the port is formed;
   the port is formed in the valve plug seating surface at a position eccentric to the center of a seal area of the valve plug, and a fluid conduction channel is formed in the valve plug seating surface extending from a position where the port is formed to a position on the opposite side of the seal area center;
   the valve plug has a stem affixed in a support orifice formed in the center of the seal area in the valve plug seating surface, and a disc that is formed on one end of the stem and opposes the valve plug seating surface;
   the port is formed at a position circumferentially eccentric to the center of the support orifice; and
   the fluid conduction channel extends from one edge of the port circumferentially around the center of the support orifice to a position that is the opposite side of the port.

7. The fluid discharge device described in claim 6, wherein:
   the valve plug seating surface is surrounded by a peripheral wall;
   a discharge opening is formed in the peripheral wall for discharging to the outside of the wall fluid flowing in from the port to a disc side when the disc of the valve plug separates from the valve plug seating surface; and
   the port and the discharge opening are formed on the same side of the center of the support orifice.

8. The fluid discharge device described in claim 6, wherein:
   the port extends arcuately around the support orifice, and is segmented circumferentially by a rib connecting an inside edge and an outside edge of the port.

9. The fluid discharge device described in claim 6, wherein:
   the depth of the fluid conduction channel is deepest where the fluid conduction channel connects to the edge of the port, and becomes gradually shallower with distance from the port.

10. The fluid discharge device described in claim 6, wherein:
    the valve plug seating surface is disposed in a dividing wall separating a fluid storage unit disposed to a carriage on which a fluid discharge head is disposed, and a flow path through which fluid in the fluid storage unit flows to the fluid discharge head; and the port passes through the dividing wall and communicates with the fluid storage unit and the flow path.

* * * * *